United States Patent
Grill et al.

(10) Patent No.: US 8,245,720 B2
(45) Date of Patent: Aug. 21, 2012

(54) WIRELESS IRRIGATION CONTROL

(75) Inventors: Benjamin Grill, Woodland Park, CO (US); Timothy P. Kranz, Woodland Park, CO (US); Oded Eddie Sturman, Woodland Park, CO (US)

(73) Assignee: Sturman BG, LLC, Woodland Park, CO (US)

( * ) Notice: Subject to any disclaimer, the term of this patent is extended or adjusted under 35 U.S.C. 154(b) by 901 days.

(21) Appl. No.: 12/269,808

(22) Filed: Nov. 12, 2008

(65) Prior Publication Data

US 2009/0126801 A1 May 21, 2009

Related U.S. Application Data

(60) Provisional application No. 60/989,415, filed on Nov. 20, 2007.

(51) Int. Cl.
*F16K 17/36* (2006.01)
*F16K 31/48* (2006.01)
*F16K 11/00* (2006.01)
*A01G 27/00* (2006.01)

(52) U.S. Cl. ............... 137/78.3; 137/625.48; 239/63; 239/69; 239/70

(58) Field of Classification Search .............. 137/78.1, 137/78.2, 78.3, 625.48, 485, 488, 492, 492.5, 137/628, 613; 239/63, 64, 65, 66, 67, 68, 239/69, 70, 563
See application file for complete search history.

(56) References Cited

U.S. PATENT DOCUMENTS

| | | | | |
|---|---|---|---|---|
| 3,989,066 A * | 11/1976 | Sturman et al. | ............ | 137/624.2 |
| 4,557,420 A * | 12/1985 | Boschung et al. | ............... | 239/66 |
| 5,139,044 A * | 8/1992 | Otten et al. | ...................... | 137/80 |
| 5,193,570 A * | 3/1993 | Mott | ............................ | 137/78.2 |
| 5,333,785 A * | 8/1994 | Dodds et al. | .................... | 239/69 |
| 5,445,182 A | 8/1995 | Sturman et al. | | |
| 5,649,562 A * | 7/1997 | Sturman et al. | .......... | 137/119.04 |
| 5,847,568 A | 12/1998 | Stashkiw et al. | | |
| 5,927,603 A * | 7/1999 | McNabb | ......................... | 239/63 |
| 6,070,610 A * | 6/2000 | Owler | ........................ | 137/624.2 |
| 6,257,264 B1 * | 7/2001 | Sturman et al. | .................... | 137/1 |
| 6,992,569 B2 * | 1/2006 | Nimberger et al. | ........ | 340/309.5 |
| 7,063,270 B2 | 6/2006 | Bowers et al. | | |
| 7,063,271 B2 | 6/2006 | Lashgari | | |
| 7,216,659 B2 * | 5/2007 | Caamano et al. | ................. | 137/1 |
| 7,280,047 B2 * | 10/2007 | Giles et al. | .................... | 340/604 |
| 2005/0216130 A1* | 9/2005 | Clark et al. | .................... | 700/284 |
| 2006/0043208 A1* | 3/2006 | Graham | .......................... | 239/71 |
| 2007/0277879 A1* | 12/2007 | Anderson et al. | ............. | 137/78.3 |

* cited by examiner

*Primary Examiner* — Craig Schneider
*Assistant Examiner* — Time Aigbe
(74) *Attorney, Agent, or Firm* — Blakely Sokoloff Taylor & Zafman LLP

(57) ABSTRACT

A control valve has an inlet, a first outlet and a second outlet. The control valve includes a poppet valve to selectably close one of the first outlet and the second outlet. A pair of diaphragms move from a first position to a second position when fluid is supplied to the control valve to permit the poppet valve to close the first passage when fluid is removed from the control valve. A magnet operably couples a wireless transmitter to a power source when fluid is supplied to the control valve. The wireless transmitter may send a signal to terminate irrigation by the control valve when the control valve is one of a plurality of control valves connected serially to a master valve only by a fluid supply line.

18 Claims, 6 Drawing Sheets

US 8,245,720 B2

WIRELESS IRRIGATION CONTROL

CROSS REFERENCE TO RELATED APPLICATIONS

This application claims priority pursuant to 35 U.S.C. 119(e) to U.S. Provisional Application No. 60/989,415, filed Nov. 20, 2007, which application is specifically incorporated herein, in its entirety, by reference.

BACKGROUND

1. Field

Embodiments of the invention relate to the field of wireless transmitters; and more specifically, to wireless transmitters integrated with fluid control valves.

2. Background

It is desirable to be able to create irrigation systems for large areas with minimal piping and wiring. This need may be met by systems in which irrigation devices such as sprinklers are controlled by hydraulic toggle valves that direct a fluid inlet to a first outlet that supplies attached irrigation devices and then redirects the fluid inlet to a second outlet that supplies a following toggle valve following a brief interruption of the fluid supply. Hydraulic toggle valves are disclosed by U.S. Pat. Nos. 5,445,182, 5,649,562, and 6,257,264, which are commonly owned with the present application. Such systems require no wiring between a system controller and the hydraulic toggle valves.

It would be desirable to use moisture sensors associated with each of the hydraulic toggle valves in such systems to avoid over watering, thus conserving water and improving the quality of the irrigation. It would also be desirable to avoid the need for wiring between the controller and the moisture sensors and the need for routine service such as battery replacement to provide power at the hydraulic toggle valves which may be dispersed over a wide area.

SUMMARY

A control valve has an inlet, a first outlet and a second outlet. The control valve includes a poppet valve to selectably close one of the first outlet and the second outlet. A pair of diaphragms move from a first position to a second position when fluid is supplied to the control valve to permit the poppet valve to close the first passage when fluid is removed from the control valve. A magnet operably couples a wireless transmitter to a power source when fluid is supplied to the control valve. The wireless transmitter may send a signal to terminate irrigation by the control valve when the control valve is one of a plurality of control valves connected serially to a master valve only by a fluid supply line.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
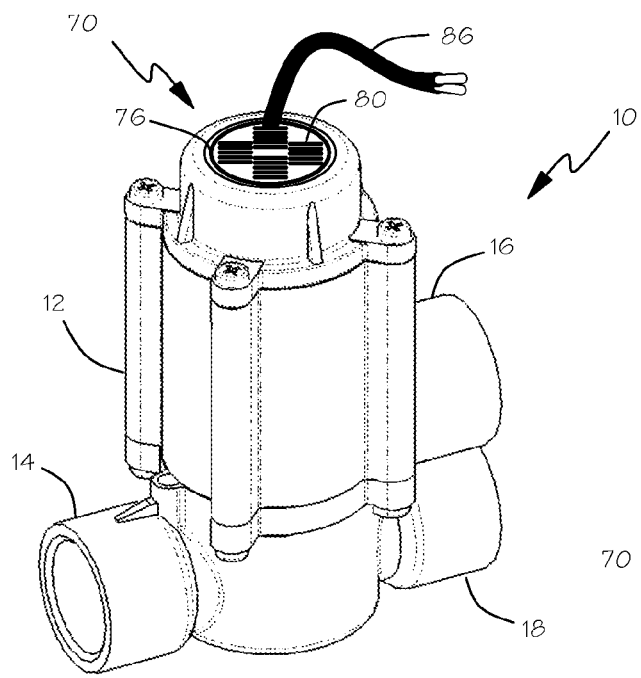
FIG. 1 is a perspective view of a valve according to an embodiment of the invention.
Figure 2:
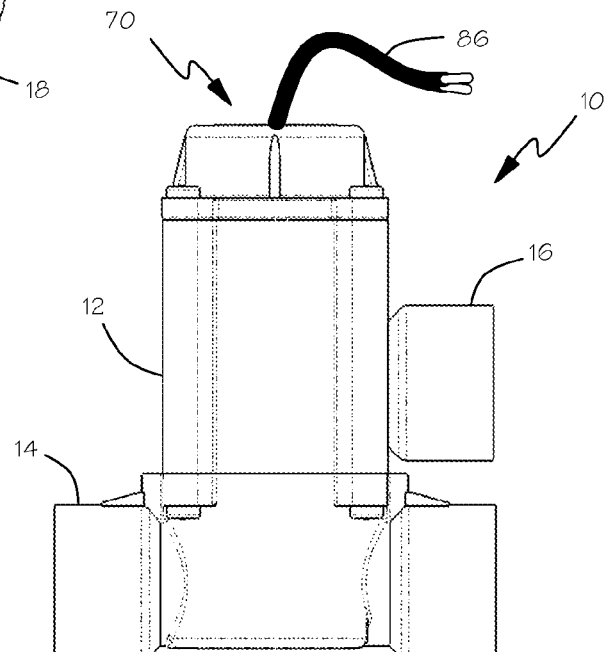
FIG. 2 is a side view of FIG. 1.
Figure 3:
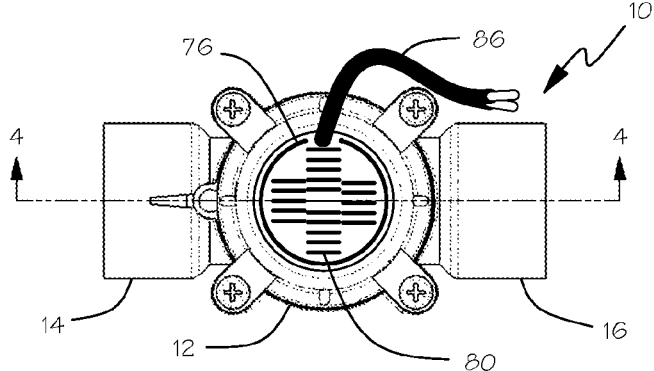
FIG. 3 is a top view of FIG. 1.

Referring to the drawings more particularly by reference numbers, FIGS. 1-3 show a control valve 10 according to an embodiment of the present invention. The valve 10 has a housing 12 with an inlet 14, a first outlet 16 and a second outlet 18. The inlet and outlets are adapted to be connected to fluid lines (not shown). The outlets and inlet may have threaded interfaces, or any other means to allow attachment to external lines or devices.

The control valve includes a wireless transmitter circuit 70. The wireless transmitter circuit may include photovoltaic solar cells 80 to provide electrical power that may be stored in a battery or capacitor. The wireless transmitter circuit may include a connection for a sensor such as a moisture sensor. The wireless transmitter circuit 70 may transmit a signal to controller to affect the operation of the control valve 10.

Figure 4:
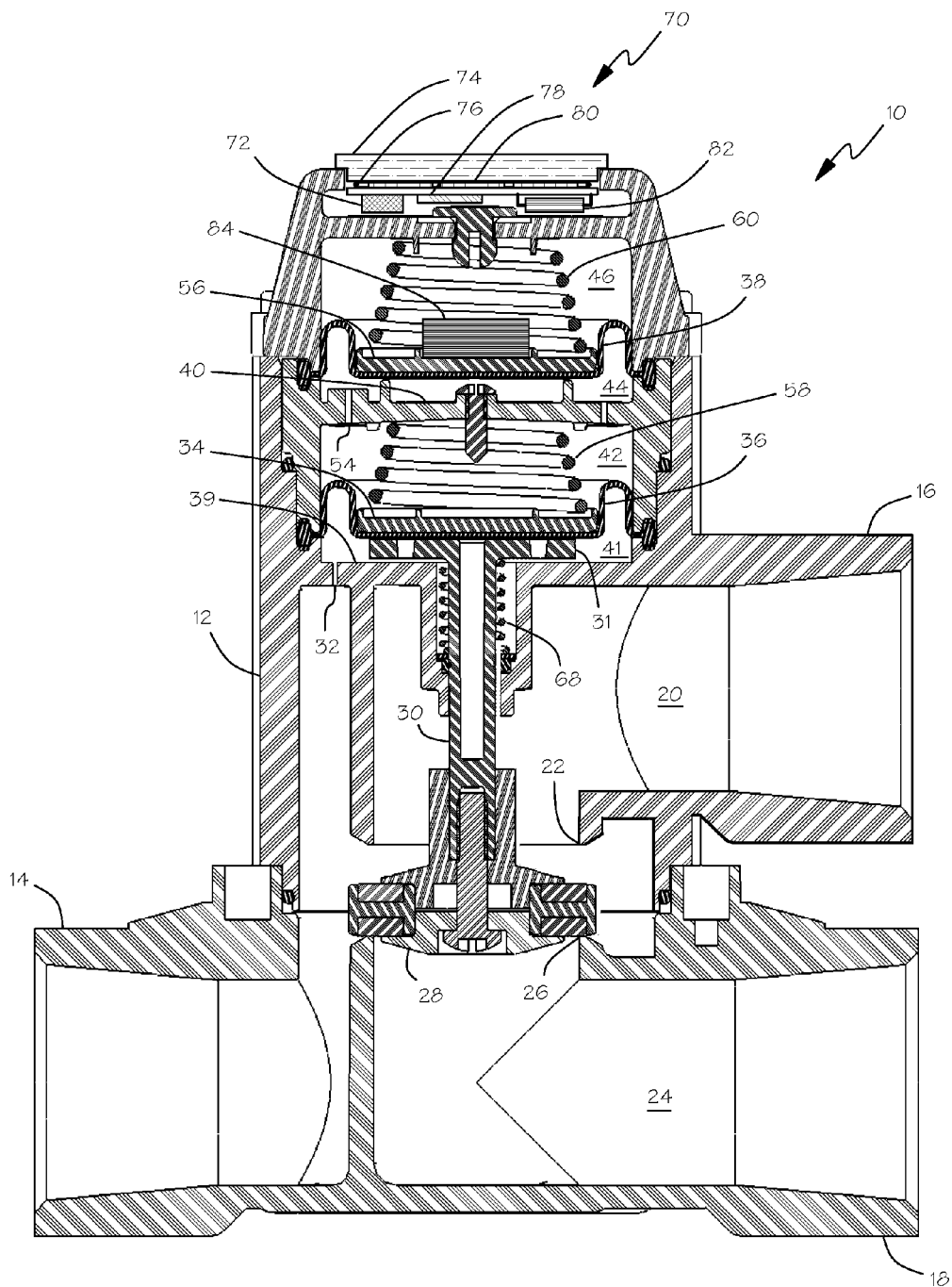
FIG. 4 is a cross-sectional view of FIG. 3, taken at line 3-3, wherein the valve is in a first operative arrangement.

As shown in FIG. 4, a section view along section line 4-4 of FIG. 3, the first outlet 16 has a first passage 20 and a first valve seat 22. The second outlet 18 has a second passage 24 and a second valve seat 26. Within the housing 12 is a poppet valve 28. The poppet valve 28 is coupled to a pushrod 30 and the assembly moves as a unit. An upper end 31 of the pushrod 30 is in contact with a first plate 34 and a first diaphragm 36 when fluid is not being supplied to the valve 10. A poppet valve spring 68 is provided to lift the poppet valve away from the second valve seat 26 and toward the first valve seat 22. A first spring 58 urges the first plate 34 downward against the upper end 31 of the pushrod 30 and overcomes the lighter poppet valve spring 68 to hold the poppet valve 28 against the second valve seat 26.

The inlet port 14 is separated from the first diaphragm 36 by a first wall 39. The first diaphragm 36, housing 12 and first wall 39 define a first chamber 41. One or more passageways 32 allow fluid communication between the inlet port 14 and the first chamber 41.

The first diaphragm 36 is separated from a second diaphragm 38 by a second wall 40. The first diaphragm 36, housing 12 and second wall 40 define a second chamber 42. The second diaphragm 38, housing 12 and second wall 40 define a third chamber 44. The second diaphragm 38 and housing 12 also form a fourth chamber 46. The fourth chamber 46 is vented to ambient to allow the second diaphragm 38 to expand and contract. A second plate 56 is in contact with the second diaphragm 38 and a second spring 60 urges the second plate and second diaphragm downward.

The diaphragms 36 and 38, are constructed from flexible material and preferably have folded portions so that the chambers can expand and contract. The second and third chambers 42, 44 may be filled with an incompressible fluid such as hydraulic oil or glycol. The second wall 40 has an orifice 54 which allows the fluid in the second and third chambers 42, 44 to flow between volumes adjacent to the first and second diaphragms (the second and third chambers) at a controlled rate.

Figure 5:
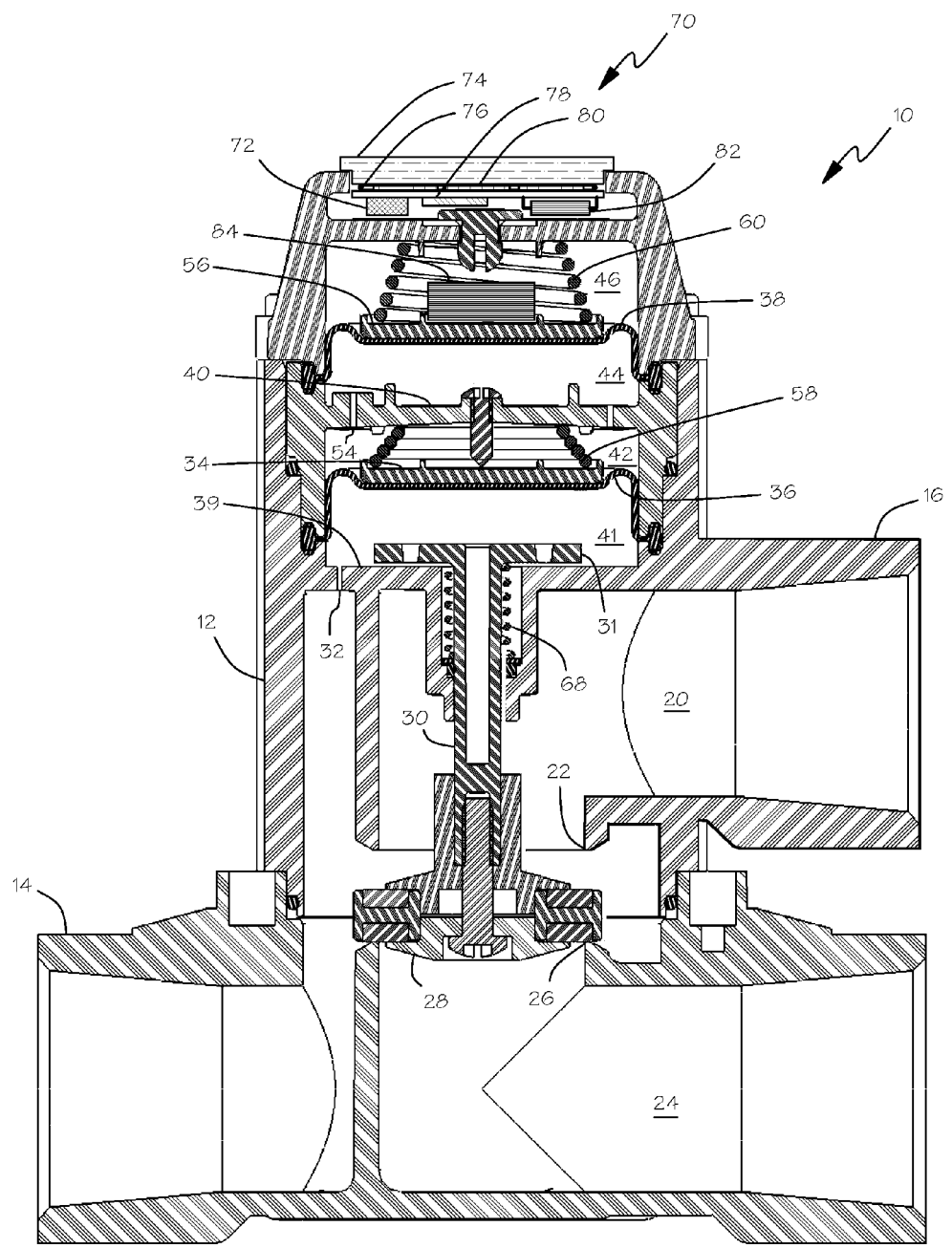
FIG. 5 is a view similar to FIG. 3, wherein the valve is in a second operative arrangement.
Figure 6:
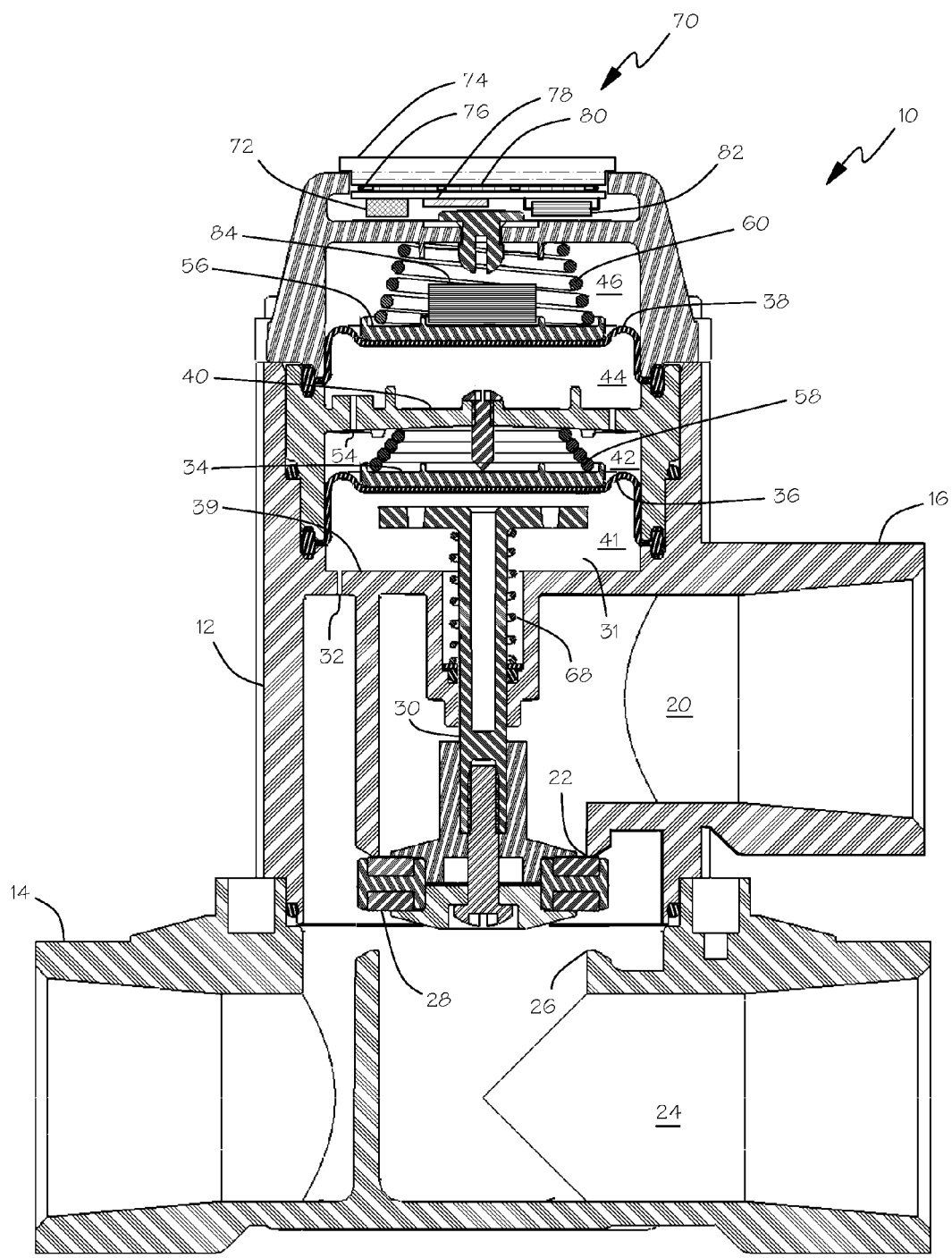
FIG. 6 is a view similar to FIG. 3, wherein the valve is in a third operative arrangement.

FIGS. 4, 5, and 6 show the operation of the control valve 10. FIG. 4 shows the control valve 10 as it is arranged when no fluid is flowing to the control valve. The poppet valve 28 closes the second valve seat 26 because of the first spring 58 acting on the first plate 34 and the upper end 31 of the pushrod 30 to press the poppet valve against the second valve seat.

When a working fluid initially flows into the inlet 14, the fluid flows around the poppet valve 28, through the open first valve seat 22, through the first passage 20, and to the first outlet 16. The pressure of the working fluid further presses the poppet 28 against the closed second seat 26 because the upper surface of the poppet is exposed to the higher pressure of the working fluid and the lower surface of the poppet is exposed to the lower pressure of the quiescent second passage 24.

The working fluid also flows through the passageway 32 in the first wall 39 into the first chamber 41 to push the first diaphragm 36 and the first plate 34 into a retracted position as shown in FIG. 5. The first diaphragm 36 and first plate 34 movement causes the second chamber 42 to contract, thereby forcing the fluid in the second chamber 42 to flow through the orifice 54 and into the third chamber 44. This fluid flow causes the second diaphragm 38 to rise and the third chamber 44 to expand. The upper end 31 of the pushrod 30 and the first plate 34 become separated as the first plate 34 moves and the poppet 28 remains fixed by the pressure of the working fluid.

As shown in FIG. 6, when the working fluid pressure at the inlet 14 drops to a threshold level (typically zero), the poppet spring 68 pushes the poppet valve 28 into a second position, thereby allowing fluid communication between the inlet 14 and the second outlet 18. The poppet spring 68 moves the poppet valve 28 when the upward force of the poppet spring is greater than the downward force on the poppet valve created by the difference between the working fluid pressure at the inlet 14 and the pressure in the second passage 24. The poppet 28 seats against the first seat 22, so that working fluid cannot flow from the inlet 14 to the first outlet 16.

At the same time, the drop in the working fluid pressure at the inlet 14 allows the force of the first and second springs 58, 60 to act on the first and second diaphragms 36, 38 to force the control fluid to flow from the third chamber 44 to the second chamber 42, thereby moving the first plate 34 back toward the original position shown in FIG. 4 where it acts to press the poppet valve 28 to first position. The flow area of the orifice 54 is typically quite small, so that there is a time delay of several tens of seconds between the time when the working fluid pressure drops, to the moment that the first plate 34 descends all the way back to its original position. During this delay time when the poppet valve 28 is not seated against the second valve seat 26, reintroducing working fluid at the inlet 14 does not create a net downward force on the poppet valve but does refill the first chamber 41 to allow the poppet spring 68 to seat the poppet valve 28 against the first valve seat 22.

As an alternate embodiment, the second wall 40 may contain a check valve that allows fluid to flow from the second chamber 42 to the third chamber 44. The check valve greatly increases the fluid flow from the second to the third chamber, to allow the first plate 34 to quickly move into the position shown in FIG. 5. The check valve insures that the poppet 28 will open when the working fluid pressure at the inlet 14 drops, even when the working fluid is first introduced to the valve 10 for only a short interval of time.

If the working fluid is subsequently reintroduced into the inlet 14 (or the pressure is increased to a threshold level) before the first plate 34 descends sufficiently to contact the upper end 31 of the pushrod 30 and move the poppet valve 28 away from the first valve seat 22, then the poppet valve will direct the working fluid to the second outlet 18. If the working fluid is not reintroduced until after the plate 34 has pushed the poppet valve 28 back against the second valve seat 26, the working fluid will again be directed to the first outlet 16. The downward movement of the first plate 34 as controlled by the orifice 54 thus acts as a mechanical timer that will allow the working fluid to be redirected from the first outlet 16 to the second outlet 18 if reintroduced to the valve 10 within a predetermined time limit.

As shown in FIGS. 1-6, the control valve includes a wireless transmitter circuit 70. The wireless transmitter circuit may be coupled to a power source 72, such as a battery or a capacitor, that is energized by light. For example, photovoltaic cells 80 (solar cells) may charge the battery or capacitor 72 when sunlight strikes the control valve 10. An optically transparent cover 74 may protect the wireless transmitter 70 from the elements while allowing light to pass through to the photovoltaic cells 80. The control valve may include a control circuit 78 to sense a moisture level from an attached moisture sensor 86 (FIGS. 1-3). The control circuit 78 may cause the wireless transmitter 76 to transmit a signal when a high moisture level is sensed. The transmitted signal may be received by a controller that turns off a master valve to stop the flow of water to the control valve 10.

A switch 82 connects the wireless transmitter 76 to the power source 72 only when working fluid is supplied to the control valve 10. For example, the switch 82 may be a magnetic reed relay that is closed when a permanent magnet 84 coupled to the second plate 56 is moved into close proximity with the reed relay 82 by the action of the control valve as described above. The connection of the wireless transmitter 76 to the power source 72 may be a direct electrical connection or it may be a logical connection where the control circuit 78 senses the closure of the reed relay 82 and energizes the wireless transmitter only when the reed relay is closed.

Figure 7:
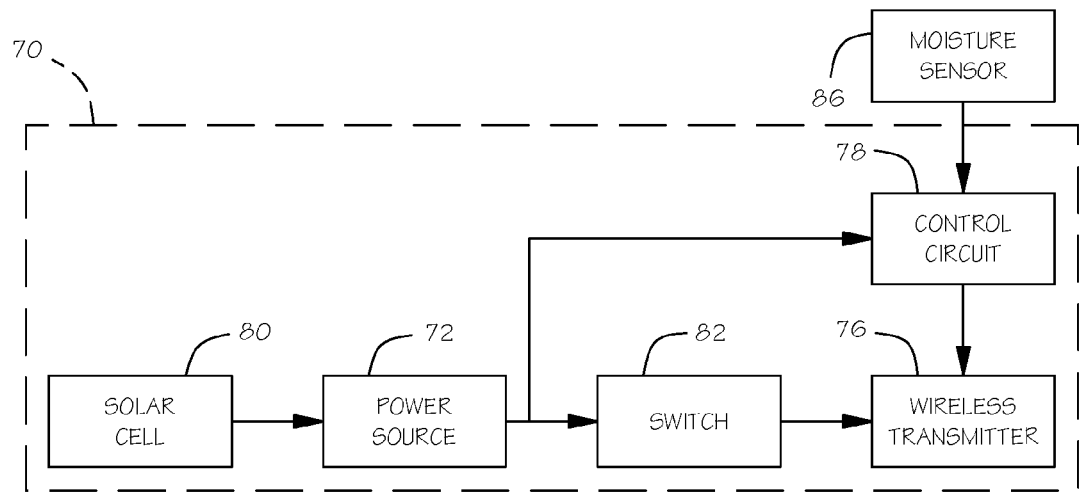
FIG. 7 is a block diagram of a first embodiment of a wireless transmitter circuit.
Figure 8:
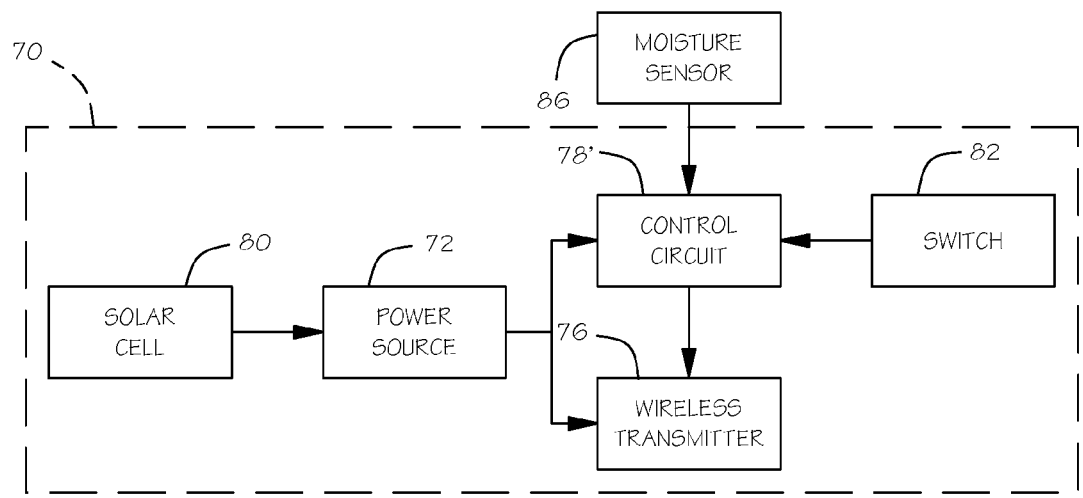
FIG. 8 is a block diagram of a second embodiment of a wireless transmitter circuit.

FIGS. 7 and 8 are block diagrams for two embodiments of the wireless transmitter 70. In both embodiments shown, the control circuit 78 is coupled to the power source 72 that is replenished by the solar cell 80. Also in both embodiments, the control circuit 78 senses a moisture level from an attached moisture sensor 86 and causes the wireless transmitter 76 to transmit a signal when the moisture sensor indicates that irrigation should be terminated.

The wireless transmitter 76 may consume a large portion of the power required by the wireless transmitter circuit 70. The switch 82, which is activated when the control valve first receives water at the inlet, may be used to limit the time the wireless transmitter 76 is energized to reduce the power consumed by the wireless transmitter circuit 70. This reduces the requirement for storage capacity in the power source 72 and power output from the solar cell 80. In the embodiment shown in FIG. 7, the wireless transmitter 76 is coupled to the power source 72 through the switch 82 so that no power flows to the wireless transmitter when the control valve is not receiving water.

In the embodiment shown in FIG. 8, the wireless transmitter 76 is always coupled to the power source 72. The switch 82 is coupled to the control circuit 78' does not activate the wireless transmitter unless the control valve is receiving water.

In either embodiment shown, the control circuit 78 activates the wireless transmitter 76 when irrigation should be terminated. After transmitting for a short period of time chosen to assure reliable reception of the signal by a controller, the control circuit 78 turns off the wireless transmitter 76 and starts a lengthy timeout period during which the wireless transmitter will not be activated.

Figure 9:
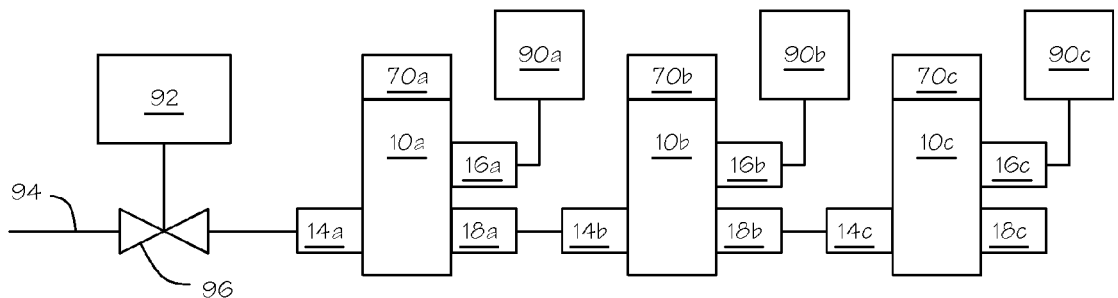
FIG. 9 is a schematic showing a system including a controller and a master valve controlling three control valves attached to each other and to three external devices.

FIG. 9 shows three control valves 10a-c connected to each other in series and to three external devices 90a-c. By way of example, the devices could be irrigation devices such as sprinklers. The first outlets 16a-c are thereby connected to the sprinklers and the second outlets 18a-b are connected to the inlet 14b-c of the next control valve. A controller 92 controls a master valve 96, which may be but is not limited to an electrically controlled two-way valve, to connect a water supply 94 to the series of control valves 10a-c. It will be appreciated that three control valves are shown by way of example and there is no particular limit to the number of control valves that may be connected in series.

When the controller 92 opens the master valve 96 so that fluid is introduced into the inlet 14a of the first valve 10a, the valve 10a directs the fluid to the first sprinkler 90a. When the working cycle of the sprinkler is finished, the fluid pressure is dropped, causing the poppet valve within the valve 10a to move into the second position as described above. If fluid is reintroduced to the valve 10a within a certain time limit, the valve 10a directs the fluid into the next control valve 10b. The valve 10b then directs the fluid to the second sprinkler 90b and the process is repeated. Thus what is shown is a hydraulic or pneumatic mechanical control circuit that sequentially powers a series of external devices. The present invention provides the added advantage of automatically resetting the poppet valves to the first position, when the working fluid no longer flows through the valves. For example, if water flow is interrupted while the valve 10b is directing flow to sprinkler 90b, the poppet valves of valves 10a and 10b will both return to the first position. Thus if flow is reintroduced to the system, all the valves will be reset and synchronized, so that the valves will sequentially direct flow to the sprinklers 90a, 90b and 90c. Thus a controller can control a large number of control valves that are serially connected to the controller only by a single working fluid supply line.

Figure 10:
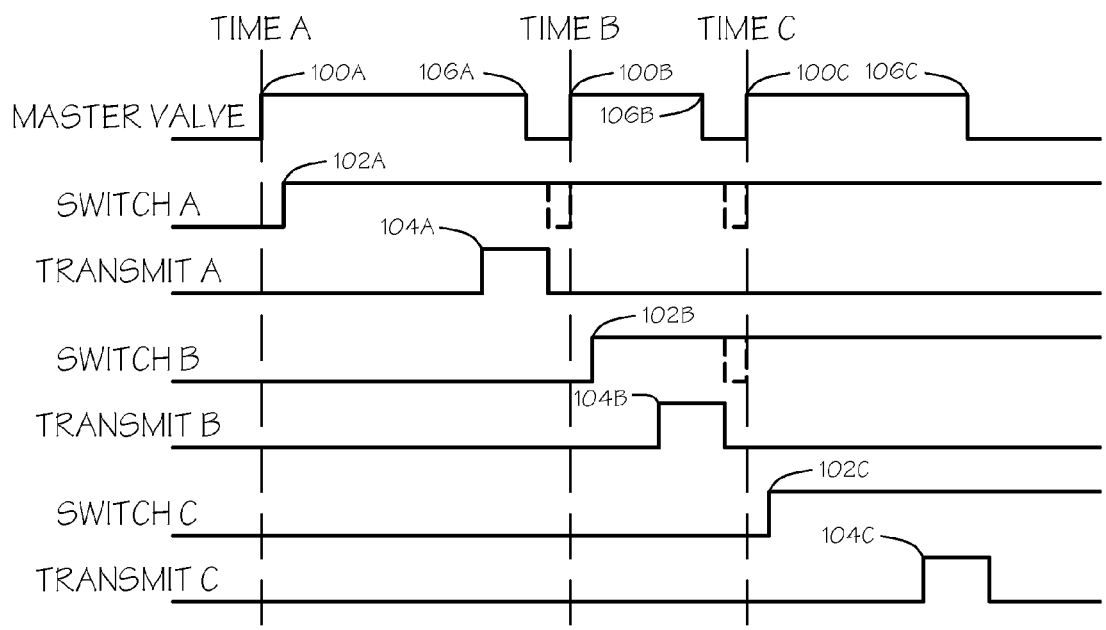
FIG. 10 is a timing diagram for an embodiment of an irrigation system.

FIG. 10 is a timing diagram (not to scale) that shows the temporal relationship of events in the system of FIG. 9. The controller 92 may initiate an irrigation cycle by opening the master valve 96 at time A 100A. The supply of water to the first control valve 10a causes the switch of the wireless transmitter circuit 70a to be activated a short time later 102A.

At some point in time the moisture sensor may indicate that irrigation by the active valve should be terminated and the control circuit will cause the wireless transmitter to transmit a signal for a predetermined length of time 104A. The controller 92 receives the wireless transmission and closes the master valve 106A to end irrigation by the active sprinkler 90a. The system repeats the cycle 100, 102, 104, 106 of events for each control valve in the system with the controller opening the master valve 96 at successive times 100B, 100C that shortly follow the closing of the master valve 106A, 106B to terminate irrigation by the upstream valve. As indicated by dotted lines in the switch signal, the switch may change states during the time period when water is shut off and then on to cause the control valve to redirect the flow from the first to the second outlet. These changes of state do not affect the operation of the wireless transmitter circuit.

In addition to conserving power, the arrangement whereby the wireless transmitter circuit 70 only transmits for a short period of time while the associated valve is active and then prevents further transmission for a lengthy timeout period may simplify the controller. The wireless transmitter circuit 70 assures that a transmitted signal is provided only by a control valve that is supplying a device on the first outlet 16. Thus there is no need to provide an identification of the valve in the transmission. The arrangement of the wireless transmitter circuit 70 further assures that there is no transmission simply because of high moisture levels, such as during rainfall, when there is no need for the controller 92 to respond to a transmission.

Figure 11:
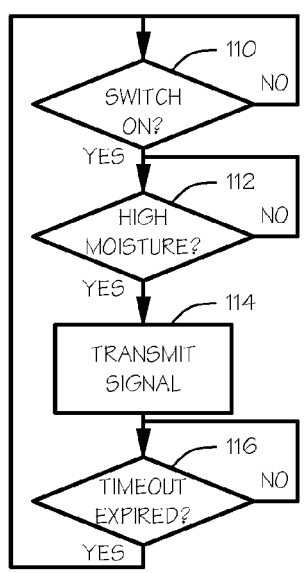
FIG. 11 is a flow chart for operations performed by an embodiment of a control circuit.

FIG. 11 is a flowchart for the sequence of operations by the control circuit in an embodiment of the invention. The control circuit may test the switch 110 to determine if the control valve is active. If the switch indicates that the control valve is not active, the switch test is repeated 110-NO indefinitely. When the switch becomes active 110-YES, the control circuit may test the moisture sensor 112 to determine if the irrigation should be terminated. If the sensor does not indicate a high moisture level, the sensor test is repeated 112-NO indefinitely. When a high moisture level is indicated 112-YES, the control circuit causes the wireless transmitter to transmit a signal 114. The control circuit then sets a lengthy timeout period, a period substantially longer than the time required to operate all the control valves in the system but less than the time between irrigation cycles. For example, the timeout period might be 18 to 22 hours to permit a daily irrigation cycle. Upon conclusion of signal transmission, the control circuit may test the timeout 116 to determine if sufficient time has elapsed to complete a system irrigation. If the timeout has not expired, the sensor test is repeated 116-NO until it does. When the timeout expires 116-YES, the control circuit again monitors the state of the switch 110 to determine if the control valve is active, thus starting a new irrigation cycle.

The controller may provide a timer that will shut off a control valve after a predetermined period of time when a wireless signal is not received. This may help to keep the system functional in the event of abnormal conditions. The lack of a wireless signal might result from a failure of the wireless transmitter circuit, a failure of the moisture sensor, a failure of the sprinkler, a failure of the master valve, or a failure of the water supply, for example. The controller may provide an indicator when a control valve was shut off by operation of the timer as an indication that the system should be checked for abnormal conditions. The indicator may be a single indicator for the entire system or a per valve indicator.

One controller may control more than one master valve with each master valve controlling one serially connected system of control valves. If more than one system of control valves is to be operated at the same time, the control valves in each system may send a wireless signal that is unique to the system. For example, each system may send a wireless signal that includes a system identification code.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A control valve having an inlet, a first outlet and a second outlet, the control valve comprising:
   means for selectably closing one of a first passage between the inlet and the first outlet and a second passage between the inlet and the second outlet;
   a first diaphragm, the first diaphragm moving from a first position in operative contact with the means for selectably closing to close the second passage and a second position that permits the means for selectably closing to close the first passage;
   a second diaphragm;
   means for separating the first and second diaphragms and for providing a controlled rate flow of fluid between volumes adjacent to the first and second diaphragms to cause the first and second diaphragms to move in unison; and
   means for making a wireless transmission only when the first diaphragm moves to the second position.

2. The control valve of claim 1 further comprising means for sensing a moisture level for making the wireless transmission when irrigation should be terminated, means for preventing a subsequent wireless transmission for a substantial length of time after making the wireless transmission.

3. The control valve of claim 1 further comprising means for sensing a position of the second diaphragm coupled to the means for making the wireless transmission.

4. The control valve of claim 1 further comprising means for generating power from incident light and means for storing the power.

5. The control valve of claim 4 further comprising means for coupling the means for storing the power to the means for making a wireless transmission only when the first diaphragm moves to the second position.

6. A control valve having an inlet, a first outlet and a second outlet, the control valve comprising:
   a poppet valve to selectably close one of a first passage between the inlet and the first outlet and a second passage between the inlet and the second outlet;
   a first diaphragm, the first diaphragm moving from a first position in operative contact with the poppet valve to close the second passage and a second position that permits the poppet valve to close the first passage;
   a second diaphragm;
   a wall that separates the first and second diaphragms, the wall having an orifice that allows a control fluid to flow between volumes adjacent to the first and second diaphragms at a controlled rate and to cause the first and second diaphragms to move in unison;
   a magnet coupled to the second diaphragm;
   a power source; and
   a wireless transmitter that is coupled to the power source, the wireless transmitter transmitting only when the magnet is moved into proximity with the wireless transmitter by movement of the second diaphragm as the first diaphragm moves to the second position.

7. The control valve of claim 6 further comprising a control circuit that is coupled to the power source and to the wireless transmitter, the control circuit to sense a moisture level from an attached moisture sensor and to cause the wireless transmitter to transmit a signal when irrigation should be terminated, and to turn off the transmitter for a substantial length of time after transmitting the signal.

8. The control valve of claim 7 further comprising a magnetically operated switch, wherein the control circuit is further coupled to the switch, the control circuit causing the wireless transmitter to transmit only when the magnet is in proximity to the switch.

9. The control valve of claim 6 wherein the power source includes a photovoltaic cell and a battery.

10. The control valve of claim 6 wherein the power source includes a photovoltaic cell and a capacitor.

11. The control valve of claim 6 further comprising a magnetically operated switch that is coupled to the power source and to the wireless transmitter, the switch coupling the power source to the wireless transmitter when the magnet is moved into proximity to the switch.

12. An irrigation system comprising:
   a master valve including an inlet coupled to a water supply and an outlet that is controllably open to the water supply;
   a plurality of control valves, each control valve including
   a housing that includes an inlet, a first outlet, and a second outlet, the inlet being coupled to one of the outlet of the master valve or the second outlet of a preceding control valve,
   a poppet valve to selectably close one of a first passage between the inlet and the first outlet and a second passage between the inlet and the second outlet,
   a first diaphragm attached to the housing, the first diaphragm moving from a first position in operative contact with the poppet valve to close the second passage and a second position that permits the poppet valve to close the first passage,
   a second diaphragm attached to the housing,
   a wall that separates the first and second diaphragms, the wall having an orifice that allows a control fluid to flow between volumes adjacent to the first and second diaphragms at a controlled rate and to cause the first and second diaphragms to move in unison,
   a magnet coupled to the second diaphragm,
   a power source, and
   a wireless transmitter that is coupled to the power source, the wireless transmitter transmitting only when the magnet is moved into proximity with the wireless transmitter by movement of the second diaphragm as the first diaphragm moves to the second position;
   a controller to provide an irrigation cycle that includes opening the master valve for a first period of time and closing the master valve for a second period of time for each of the plurality of control valves, the controller ending the first period of time upon receipt of a wireless signal from any of the plurality of control valves.

13. The irrigation system of claim 12 wherein the controller includes a timer that ends the first period of time if the wireless signal is not received within a predetermined length of time.

14. The irrigation system of claim 13 wherein the controller includes an indicator that indicates if the timer and not receipt of the wireless signal ended the first period of time for one of the plurality of control valves.

15. The irrigation system of claim 14 wherein the indicator is associated with exactly one of the plurality of control valves and indicates if the timer and not receipt of the wireless signal ended the first period of time for the one of the plurality of control valves associated with the indicator.

16. The irrigation system of claim 12 wherein the control valve further comprises a control circuit that is coupled to the power source and to the wireless transmitter, the control circuit to sense a moisture level from an attached moisture sensor and to cause the wireless transmitter to transmit a signal when irrigation should be terminated, and to turn off the transmitter for a substantial length of time after transmitting the signal.

17. The irrigation system of claim 16 wherein the control valve further comprises a magnetically operated switch, wherein the control circuit is further coupled to the switch, the control circuit causing the wireless transmitter to transmit only when the magnet is in proximity to the switch.

18. The irrigation system of claim 12 wherein the control valve further comprises a magnetically operated switch that is coupled to the power source and to the wireless transmitter, the switch coupling the power source to the wireless transmitter when the magnet is moved into proximity to the switch.

* * * * *